Nov. 30, 1926.

F. D. REYNOLDS

CHAIN CONNECTER

Filed March 21, 1925

1,609,200

Inventor
F. D. Reynolds
Cornwall, Bedell & Janney
By
Atty's.

Patented Nov. 30, 1926.

1,609,200

UNITED STATES PATENT OFFICE.

FREDERICK D. REYNOLDS, OF ST. LOUIS, MISSOURI, ASSIGNOR TO THE KANT-SKID CHAIN COMPANY, OF ST. LOUIS, MISSOURI, A CORPORATION OF MISSOURI.

CHAIN CONNECTER.

Application filed March 21, 1925. Serial No. 17,200.

My invention relates to new and useful improvements in chain connecters for automobile tire chains, the objects being to provide a chain connecter which can be easily manipulated and which, when in closed position, is securely held against accidental disengagement or release.

Further objects of the invention are to provide an easily operable chain connecter by means of which the chain can be drawn and maintained taut and which can be readily released to disconnect the terminals of the chain.

Other objects of the invention are to provide a simple and efficient chain connecter which can be manufactured at low cost and can be readily applied to the chain.

With these and other objects in view, my invention consists in certain novel features of construction and arrangement of parts, hereinafter more fully described and claimed, and illustrated in the accompanying drawings, in which—

Figure 1:
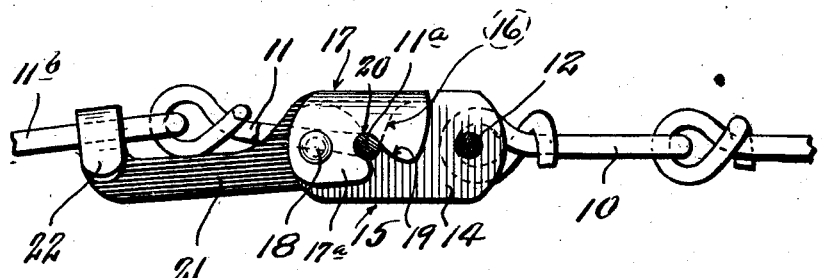
Figure 1 is a side elevational view of the chain connecter showing the same in closed engagement with the chain.

Referring by numerals to the accompanying drawings, 10 indicates one terminal link of a tire chain and 11 denotes the other terminal link of said chain. A rivet or pin 12 secures link 10 to the plate or seat member 14 of a chain connecter 15. This plate member has formed in its upper edge a seat or slot 16 which is adapted to receive and have seated therein the transverse portion 11ª of the link 11. A closure or retainer member 17 of inverted U-shape cross section is fulcrumed at 18 to member 14 and has formed in its side walls 17ª downwardly opening and upwardly inclined slots 19. The slots are inclined in a direction opposite to the slot 16 and terminate in alignment with the bottom of the latter slot so that when member 17 occupies closed position, said slots cooperate to form an aperture 20 for receiving the link portion 11ª. Thus when retainer member 17 is closed, link 11 is securely held in position and cannot become unseated.

In order to prevent accidental displacement of member 17 when in closed position, said member is formed with an extension 21 which projects forwardly a suitable distance and terminates in a laterally disposed hook 22 which is presented in the direction taken by said extension when member 17 is moved to open position. By bringing said hook in engagement with one of the longitudinally disposed portions 11ᵇ of one of the chain links as shown in Figure 1, said extension is locked against movement, thereby positively holding said retaining member 17 against accidental displacement. Furthermore, this extension forms a lever by means of which the chain can be tightened during the closing of the chain connecter.

Figure 2:
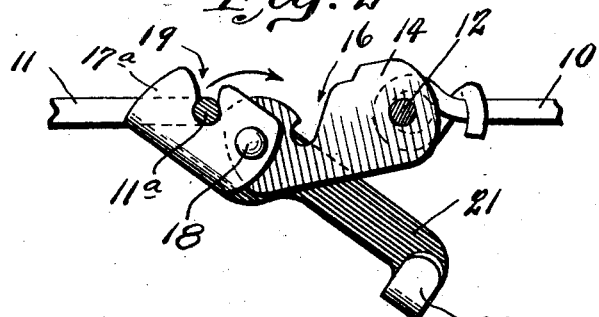
Figure 2 is a similar view but showing the chain connecter in open position.
Figure 3:
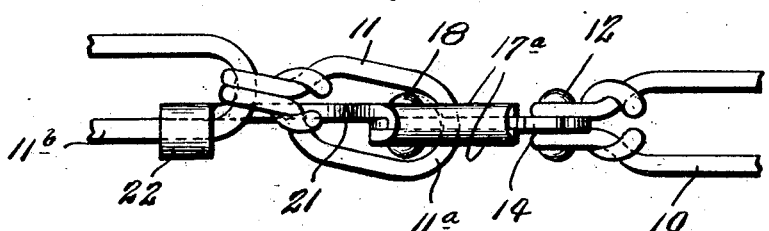
Figure 3 is a top plan view of the chain connecter when in closed position.
Figure 4:
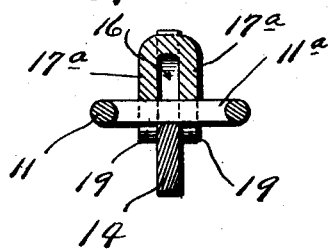
Figure 4 is a vertical cross section taken on lines 4—4 of Figure 3.

In using the device, member 17 is moved into open position as shown in Figure 2 and the terminal link 11 is engaged with the transverse portion 11ª thereof occupying slot 19. As this slot is presented to the near side of fulcrum 18. no difficulty is experienced in placing link 11 in position. Lever 21 is now operated on fulcrum 18, thereby moving the U-shaped portion 17 in the direction indicated by the arrow and drawing link 11 toward link 10, thereby tightening the chain. When member 17 reaches the closed position, portion 11ª is seated in slot 16 of member 14 with the slotted side walls 17ª overlapping said member 14 and closing slot 16. Hook 22 is now brought into engagement with the corresponding link so as to prevent disengagement of member 17.

A chain connecter of my improved construction is simple and durable, can be easily operated, and forms a positive lock for the terminal links of the chain.

I claim:

1. A chain connecter comprising a plate provided with an upwardly presented slot terminating in a link seat, an inverted U-shaped retaining member fulcrumed on said plate and provided with a slot in opposed relation with the slot of said plate and terminating in a seat aligned with the first-mentioned seat, and an extension formed integral with said retaining member and projecting longitudinally therefrom in a direction opposite to said U-shaped portion and provided with an integral laterally disposed hook adapted to engage a chain link at a point beyond said chain connecter and lock said inverted U-shaped member in closed position.

2. A chain connecter comprising a plate adapted to be permanently connected to one of the terminal links of a tire chain and provided with an upwardly and rearwardly inclined slot which terminates in a seat for receiving the other terminal link of said chain, and a lever fulcrumed on one end of said plate to one side of said seat, one end of said lever being formed of inverted U-shape and movable downwardly over the upper edge and sides of said plate member, the side portions of said U-shaped member being provided with slots oppositely inclined with respect to the first-mentioned slot and cooperating therewith, the other end of said lever forming an extension operable in opposite direction to said U-shaped end and provided with a laterally disposed hook for engaging an integral chain link and holding said lever in closed position.

3. A chain connecter comprising a plate adapted to be permanently connected at one end to one of the terminal links of a tire chain and provided near its opposite end with a downwardly extending slot for receiving the other terminal link of said chain, and a lever fulcrumed on said plate member and having one end of inverted U-shape, the sides of which are transversely slotted for cooperating with the slot of said plate in receiving and retaining said free terminal link of said chain and provided with an extension for manually engaging said lever, said extension projecting longitudinally in opposite direction from said U-shaped end terminating in an integral laterally disposed hook for engaging a chain link at a point spaced from said chain connecter for locking said lever in closed position.

4. A chain connecter comprising a plate adapted to be permanently secured to one terminal link of a tire chain and provided with an upwardly and rearwardly inclined slot for detachably receiving the free terminal link of said chain, an inverted U-shaped retaining member fulcrumed on said plate and movable in closed engagement therewith, to enclose the top and sides of said plate, the side portions of said retaining member being provided with coinciding slots in anti-clinal relation with the first slot and cooperating therewith to form a closed seat for said free terminal link, an extension projecting in the opposite direction from the fulcrum of said retaining member for manipulating the latter in one direction for receiving said free link and in the opposite direction for bringing said retaining member and said terminal link in closed position with said plate member, thereby tightening said chain, and a hook formed integral with and projecting laterally from said extension and adapted to engage one of the longitudinal portions of a chain link at a point remote from said connecter when said retaining member occupies closed position.

In testimony whereof I hereunto affix my signature this 17th day of March, 1925.

FREDERICK D. REYNOLDS.